US011349946B2

(12) United States Patent
Chu et al.

(10) Patent No.: US 11,349,946 B2
(45) Date of Patent: May 31, 2022

(54) DYNAMIC STREAMING ANALYTICS

(71) Applicant: SAP SE, Walldorf (DE)

(72) Inventors: David Chu, Toronto (CA); Tim McConnell, Kitchener (CA); Wayne Pau, Toronto (CA); Lalit Canaran, Toronto (CA)

(73) Assignee: SAP SE, Walldorf (DE)

( * ) Notice: Subject to any disclaimer, the term of this patent is extended or adjusted under 35 U.S.C. 154(b) by 103 days.

(21) Appl. No.: 16/193,437

(22) Filed: Nov. 16, 2018

(65) Prior Publication Data

US 2020/0162572 A1    May 21, 2020

(51) Int. Cl.
| | | |
|---|---|---|
| *H04L 67/12* | (2022.01) | |
| *H04L 67/564* | (2022.01) | |
| *H04L 67/10* | (2022.01) | |
| *G06F 3/04847* | (2022.01) | |

(52) U.S. Cl.
CPC .......... *H04L 67/2819* (2013.01); *H04L 67/10* (2013.01); *H04L 67/12* (2013.01); *G06F 3/04847* (2013.01)

(58) Field of Classification Search
CPC . H04L 63/10; H04L 12/2803; H04L 12/2825; H04L 43/16; H04L 63/1416; H04L 12/2807; H04L 12/2816; H04L 67/025; H04L 67/12; H04L 67/125; H04L 67/10; H04L 67/18; H04L 67/303; H04L 67/306; H04L 12/281; H04L 12/2819; G06Q 30/0269; G06Q 10/06; G06Q 30/0257; G06Q 50/06; Y02E 70/30; Y02E 10/50; Y02E 10/47; Y02E 10/56; G06F 11/3409; G06F 11/3433; G06F 1/3206; G06F 1/3212; G06F 9/505; G06F 11/079; G06F 11/07; G06N 5/04; G05B 15/02; G05B 2219/2639; H02G 15/08; H02G 1/14; Y04S 20/222; Y04S 20/242
See application file for complete search history.

(56) References Cited

U.S. PATENT DOCUMENTS

| | | | | |
|---|---|---|---|---|
| 8,849,472 | B2 * | 9/2014 | Pugh .................. | H02J 13/0006 307/29 |
| 10,510,126 | B2 * | 12/2019 | Ho ....................... | G08B 21/182 |
| 10,536,361 | B2 * | 1/2020 | Frei ...................... | H04L 67/125 |
| 10,671,502 | B1 * | 6/2020 | Haslam ............... | G06F 11/3013 |
| 2007/0109984 | A1 * | 5/2007 | Buchholz ............. | H04W 84/10 370/310.2 |
| 2008/0005729 | A1 * | 1/2008 | Harvey ................ | G06F 8/71 717/155 |
| 2010/0105445 | A1 * | 4/2010 | Brunton ............. | H04M 1/6066 455/567 |

(Continued)

*Primary Examiner* — Tonia L Dollinger
*Assistant Examiner* — Linh T. Nguyen
(74) *Attorney, Agent, or Firm* — Buckley, Maschoff & Talwalkar LLC

(57) ABSTRACT

A method includes, at an edge location, receiving one or more threshold settings associated with a sensor, configuring a rule specifying a trigger condition for a task, wherein the trigger condition is based on the one or more threshold settings, receiving a sensor data stream from the sensor, determining that the trigger condition has been satisfied, and responsive to the determination that the trigger condition has been satisfied, automatically executing the task specified by the rule.

22 Claims, 14 Drawing Sheets

(56) References Cited

U.S. PATENT DOCUMENTS

| | | | | |
|---|---|---|---|---|
| 2010/0145479 | A1* | 6/2010 | Griffiths | G01D 21/00 |
| | | | | 700/17 |
| 2010/0214090 | A1* | 8/2010 | Sartini | H04L 67/26 |
| | | | | 340/517 |
| 2012/0102098 | A1* | 4/2012 | Guillou | G06F 9/5083 |
| | | | | 709/203 |
| 2012/0256009 | A1* | 10/2012 | Mucignat | G05D 23/193 |
| | | | | 236/1 C |
| 2014/0005809 | A1* | 1/2014 | Frei | H04L 67/10 |
| | | | | 700/90 |
| 2014/0266669 | A1* | 9/2014 | Fadell | H04L 12/2803 |
| | | | | 340/501 |
| 2016/0021040 | A1* | 1/2016 | Frei | G05B 15/02 |
| | | | | 709/206 |
| 2016/0208763 | A1* | 7/2016 | Fernandez | G01P 13/00 |
| 2016/0285708 | A1* | 9/2016 | Papadopoulos | H04L 67/10 |
| 2016/0334770 | A1* | 11/2016 | Laycock | G05B 23/027 |
| 2017/0348562 | A1* | 12/2017 | Jung | A61B 5/0022 |
| 2018/0139818 | A1* | 5/2018 | Coombes | H05B 45/22 |
| 2018/0204293 | A1* | 7/2018 | Bazhinov | H02B 1/24 |
| 2018/0337801 | A1* | 11/2018 | Hirsch | H04L 12/2825 |
| 2019/0065006 | A1* | 2/2019 | Luo | G06F 30/00 |
| 2019/0098073 | A1* | 3/2019 | Modai | G06F 8/60 |
| 2019/0179610 | A1* | 6/2019 | Aiken | H04L 12/2829 |
| 2019/0226898 | A1* | 7/2019 | Gray, Jr. | H04W 4/90 |
| 2019/0268310 | A1* | 8/2019 | Guberman | H04L 67/12 |
| 2019/0346356 | A1* | 11/2019 | Karnik | G01N 1/2205 |
| 2020/0014208 | A1* | 1/2020 | Bickel | H02H 7/26 |
| 2020/0349484 | A1* | 11/2020 | Serven | G06N 3/08 |

* cited by examiner

700

Temperature
Sensor Profile

General Information

Sensor Profile ID: 32c6f4b4-a799-11e8-8000-931e2166cb39
Sensor Profile Name: Temperature
Stream Reading To Monitor: ☑
*Sensor Type: ⦿ Numeric ◯ State

Testing & Production Parameters

*Minimum Value: 0
*Maximum Value: 100

Window Parameters

*Maximum # of Readings...: 3
*Window Size: 40

| sec | min | hr |

Maximum Reading Frequency: 13333 ms

Rules  +

| Rule Name | Description | Rule Type | Rule State | Data Source Last Updated |
|---|---|---|---|---|
| ~~~~ | ~~~~~ | ~~~~~ | ~~ | ~~~~~ |
| ~~~~ | ~~~~~ | ~~~~~ | ~~ | ~~~~~ |

Save    Cancel

| Door |
|---|
| Sensor Profile |

General Information

Sensor Profile ID: d41e8dc2-b0c7-11e8-8000-83135ff63c0

Sensor Profile Name: Door

Stream Reading To Monitor: ☑

*Sensor Type: ○ Numeric  ⦿ State

States

*State Name | *State Value | +
--- | --- | ---
1 | Closed |
0 | Open |

Rules                                                              +

| Rule Name | Description | Rule Type | Rule State | Data Source Last Updated |
|---|---|---|---|---|
| ~~~ | ~~~~~ | ~~~~~ | ~~ | ~~~~~ |
| ~~~ | ~~~~~ | ~~~~~ | ~~ | ~~~~~ |

Save   Cancel

| | |
|---|---|
| | Add New Rule |
| General Information | |
| Sensor Profile ID: | 32c6f4b4-a799-11e8-8000-931e2166cb39 |
| Sensor Profile Name: | Temperature |
| Rule ID: | |
| *Rule Name: | Temp Too High |
| Rule Description: | Triggers when average temperature is over 70 degrees |
| Rule Context Data: | |
| Rule Chainability: | ☑ |
| Rule Definition | |
| *Rule Type: | Value Monitoring ▽ |
| Use Rule Data Source: | ☐ |
| *Scope Level: | Sensor Profile    32c6f4b4-a799-11e8-8000-931e2166cb39 |
| *Thresholding Value: | 70 |
| *Thresholding Operator: | > ▽ |
| *Max Event Frequency: | 5    ms | sec | min | hr |
| | Save    Cancel |

Add New Rule

General Information

Sensor Profile ID: d41e8dc2-b0c7-11e8-8000-831345ff63c0
Sensor Profile Name: Door
Rule ID:
*Rule Name: Door Ajar
Rule Description: Triggers when door has been open for longer than 1 hour
Rule Context Data:
Rule Chainability: ☑

Rule Definition

*Rule Type: Timed State
*Scope Level: Sensor Profile | d41e8dc2-b0c7-11e8-8000-831345ff63c0
*Target State: 0 - Open
*Time In State: 1 | ms | sec | min | hr

Save  Cancel

Add New Rule

General Information

Sensor Profile ID: 32c6f4b4-a799-11e8-8000-931e2166cb39
Sensor Profile Name: Temperature
Rule ID:
*Rule Name: Temp Sensor Unavailable
Rule Description: Fires if temperature sensor has gone silent for over 5 minutes
Rule Context Data:
Rule Chainability: ☐

Rule Definition

*Rule Type: Sensor Watchdog
*Scope Level: Sensor Profile | 32c6f4b4-a799-11e8-8000-931e2166cb39
*Max Interval Without Reading: 5 | ms | sec | min | hr
*Max Event Frequency: 1 | ms | sec | min | hr

Save   Cancel

Add New Rule

General Information

| | |
|---|---|
| Sensor Profile ID: | 7e954d64-84d2-11e6-80000-a5cbf20378d0 |
| Sensor Profile Name: | COMPOSITE |
| Rule ID: | |
| *Rule Name: | Hot and Breezy |
| Rule Description: | Event triggers when temperature is over 70 degrees and the door is open |
| Rule Context Data: | |
| Rule Chainability: | ☐ |

Rule Definition

| | |
|---|---|
| *Rule Type: | Rule Chaining ▽ |
| Scope Level: | Device Wide ▽ |
| *Rule Name 1: | Temp Too High (3d5d09f2-b0... ▽ |
| *Rule Name 2: | Door Ajar (0307df52-b0c9-11e... ▽ |
| *Time Gap: | 1   ms \| sec \| min \| hr |
| Event Ordered: | ☐ |
| *Max Event Frequency: | 5   ms \| sec \| min \| hr |

Save    Cancel

Add New Rule

General Information

| | |
|---|---|
| Sensor Profile ID: | 32c6f4b4-a799-11e8-8000-931e2166cb39 |
| Sensor Profile Name: | Temperature |
| Rule ID: | |
| *Rule Name: | Custom CCL Rule |
| Rule Description: | This custom CCL rule analyzes the sensor data to trigger events based on custom logic |
| Rule Context Data: | |
| Rule Chainability: | ☐ |

Rule Definition

| | | |
|---|---|---|
| *Rule Type: | External Custom Rule ▽ | |
| *Scope Level: | Sensor Profile ▽ | 32c6f4b4-a799-11e8-8000-931e2166cb39 |
| *Custom Project Host: | 192.168.2.17 | |
| *Custom Project Port: | 9361 | |
| *Max Event Frequency: | 5 | ms sec min hr    Get template CCL code |

Save    Cancel

*FIG. 13*

DYNAMIC STREAMING ANALYTICS

BACKGROUND

Conventional sensors may operate to acquire data and to generate alerts based on the acquired data. The alerts may be generated according to rules, which may in turn be generated based on sensor records or models. The rules are generated at design/configuration time and based on manually-configured logic that must be restarted when rules and/or values change. This presents challenges for edge analytics, for example, due to the volume of data generated at the edge by IoT (Internet of Things) systems and devices that can overwhelm available resources.

Current edge solutions lack the ability to integrate efficiently with systems at the edge, for example, to automatically create transactions based on IoT sensor data insights. Therefore, more intelligence is needed at the edge to enable transactions based on IoT sensor data insights.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 7 is an outward view of a user interface according to some embodiments.

FIG. 8 is an outward view of a user interface according to some embodiments.

FIG. 9 is an outward view of a user interface according to some embodiments.

FIG. 10 is an outward view of a user interface according to some embodiments.

FIG. 11 is an outward view of a user interface according to some embodiments.

FIG. 12 is an outward view of a user interface according to some embodiments.

FIG. 13 is an outward view of a user interface according to some embodiments.

Figure 1:
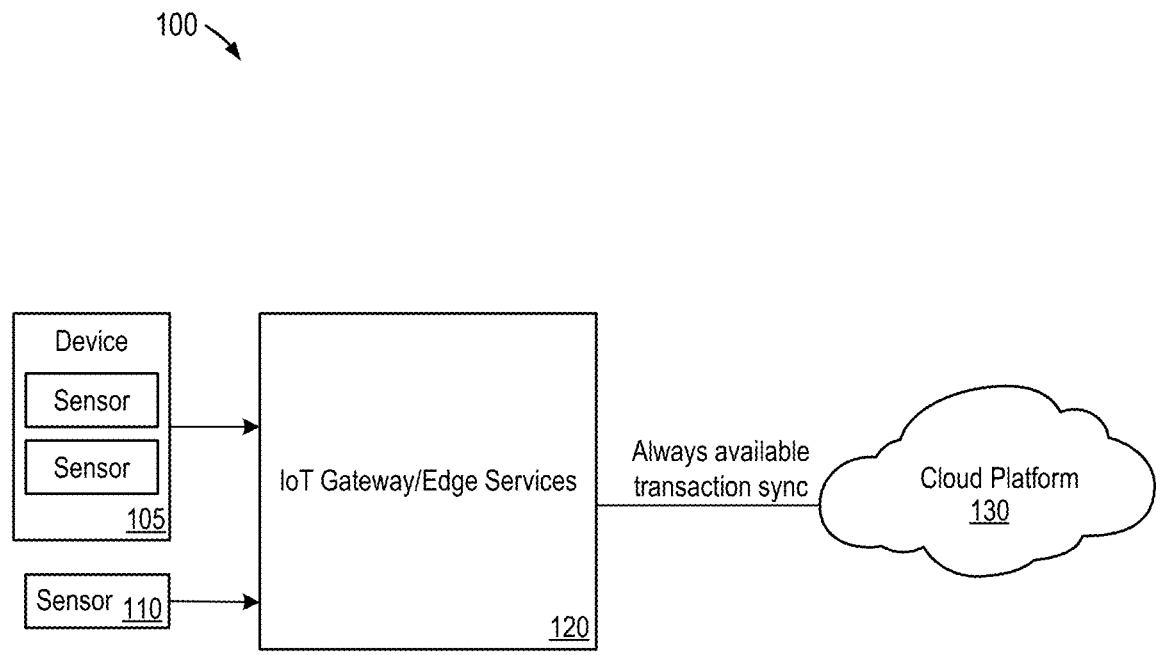
FIG. 1 is a block diagram of an overall system architecture according to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments generally relate to the field of edge computing, and more specifically to incorporating changing context and operation information (e.g., of IoT devices and sensors) into streaming analytics. This allows for automation of processes and workflows using sensor data.

A streaming analytics technique and system is desired which provides an out-of-the-box capability to integrate with ERP (Enterprise Resource Planning) systems (e.g., business processes) at the edge.

As disclosed herein, edge services provides the ability to set and distribute policies from the cloud, so that raw data can be enriched with business context at the edge, converted into meaningful insights for decision-making, while triggering actions without requiring a round-trip to the cloud. For example, IoT sensor data insights (e.g., equipment threshold settings/parameters) may be translated to edge transactions that provide enterprise-related functionalities via configured rules. In addition, these actions may be communicated back to the digital core (e.g., providing an end-to-end solution).

The environments described herein are merely exemplary, and it is contemplated that the techniques described may be extended to other implementation contexts.

One or more embodiments that include one or more of the advantages discussed are described in detail below with reference to the figures.

FIG. 1 is a block diagram of an overall system architecture 100 according to some embodiments. Architecture 100 includes sensor(s) (e.g., multiple sensors of a device 105 or a single sensor 110), IoT gateway/edge services 120, and cloud platform 130. IoT gateway 120 provides data persistence and processing capabilities at the edge.

IoT edge computing describes the capability of processing, storing, and analyzing sensor data as well as decision making at IoT gateways. Edge computing moves processing and data storage away from the cloud or enterprise data center out to the devices on the edge of the network close to the source of the data.

Each of the illustrated components may be implemented by software and/or one or more hardware elements, with some software and/or hardware elements being shared among more than one illustrated component.

Some of the elements of architecture 100 resemble the structure and functionality of software modules developed by SAP AG. However, structures with similar functionalities could be found in software products developed by other vendors, as well. Alternative embodiments may utilize other kinds of computer system architectures.

Figure 2:
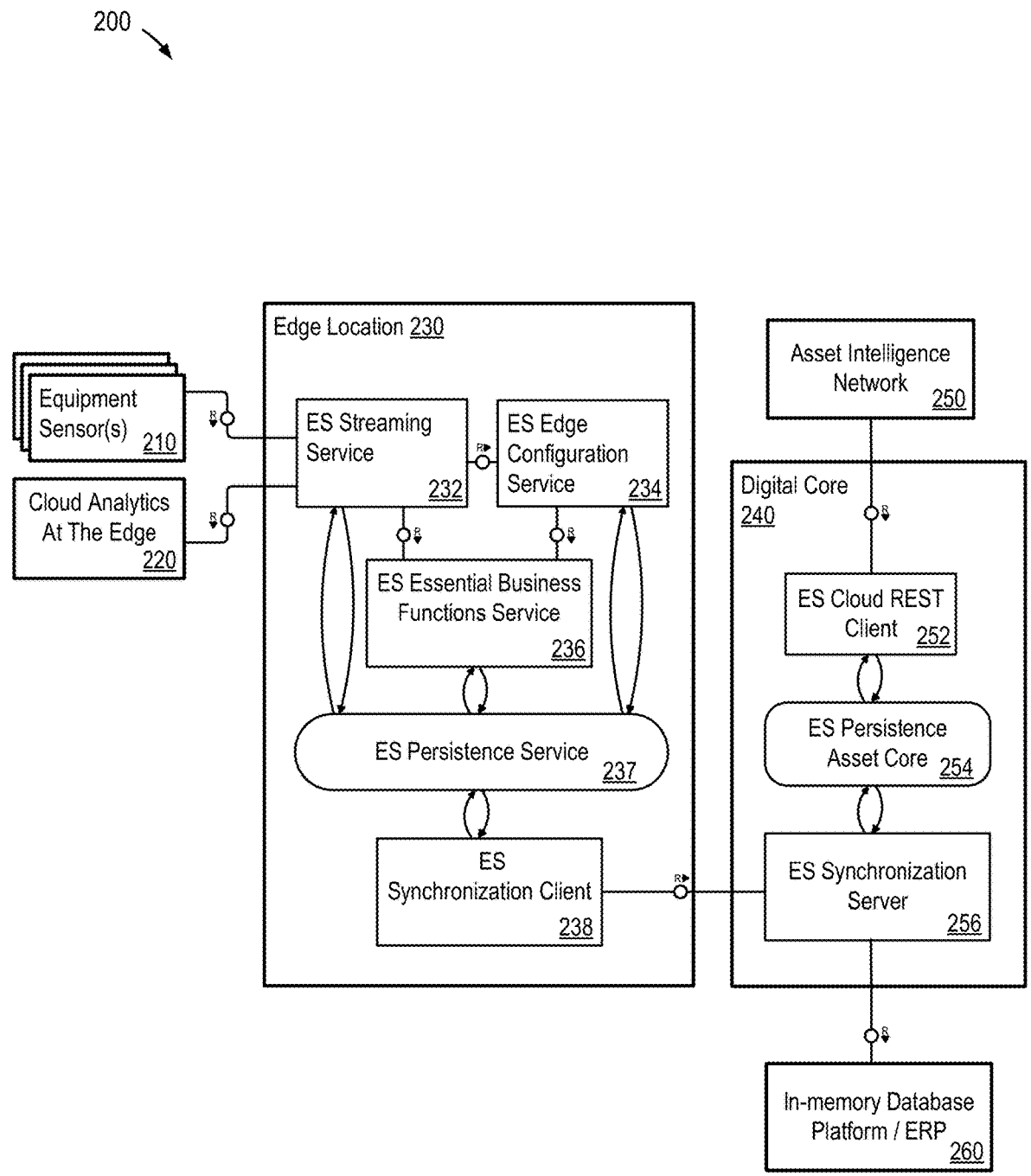
FIG. 2 is a more detailed block diagram of the system illustrated in FIG. 1 according to some embodiments.

FIG. 2 is a more detailed block diagram of the system of FIG. 1 in which illustrative subcomponents of the system and their relationships to each other are shown. Architecture 200 includes equipment sensor(s) 210, cloud analytics at the edge 220, edge location 230, digital core 240, and Asset Intelligence Network ("AIN") 250 (also referred to as "Asset Central" ("AC")). Cloud analytics at the edge 220 refers to applications that use cloud resources for analytics processing or the delivery of analytical insights. AIN 250 is a central cloud-based information repository/exchange for equipment manufacturers, operators and maintenance providers in asset-intensive industries. AIN 250 collects and tracks information (e.g., from OEM specs to IoT sensor output) needed to monitor, manage, and maintain mission-critical equipment. Using AIN, operators may access up-to-date maintenance strategies and manuals from manufacturers, and manufacturers automatically receive asset usage and failure data.

Edge services ("ES") at edge location 230 includes streaming service 232, edge configuration service 234 (e.g., rules engine), Essential Business Functions ("EBF") service 236, persistence service 237, and synchronization client 238. Digital core (ES backend integration) 240 includes cloud REST (Representational State Transfer) client 252, persistence asset core 254, and synchronization server 256. The digital core 240 may also include in-memory database platform and ERP 260.

Streaming service/engine 232 analyzes IoT data streams. IoT administrators can define conditions with adjustable time windows to identify patterns in the incoming IoT data as a basis for automated events. For example, certain conditions can initiate transactions and notify appropriate parties.

Streaming service 232 provides support for dynamic context through the addition of a rule data sources feature. Rule data sources provide dynamic configuration to one or more rules. The feature allows configuration of a rule to be updated automatically from a HTTP backend capable of returning a JSON (JavaScript Object Notation) response. For example, the threshold value for a value monitoring rule can be dynamically updated from a HTTP backend, or from the local EBF service 236. Advantageously, this allows rules to be configured where the threshold value is either unknown at design time, or dynamically changes over time.

EBF service 236 executes transactions at the edge to provide continuity for critical functions even when the edge is disconnected from the core. EBF service 236 is integrated with Asset Intelligence Network 250 so that supported data objects (e.g., manufacturer equipment models and attributes, including measurement thresholds) can be made available at the edge for consumption via available application programming interfaces (APIs). EBF at the edge 236 exposes AIN's 250 equipment data.

Persistence service 237 stores IoT data on IoT gateways. IoT administrators can determine which data should be stored locally and set a data aging policy. Data is stored and forwarded when there is network connectivity. Similarly, persistence asset core 254 is a data repository/store with store and forward capabilities.

Synchronization is initiated by the edge database server. Changes are uploaded to the synchronization server through the network layer.

Database 260 may comprise any query-responsive data source or sources that are or become known, including but not limited to a structured-query language (SQL) relational database management system. Database 260 may comprise a relational database, a multi-dimensional database, an eXtendable Markup Language (XML) document, or any other data storage system storing structured and/or unstructured data. The data of database 260 may be distributed among several relational databases, dimensional databases, and/or other data sources. Embodiments are not limited to any number or types of data sources.

In some embodiments, the data of database 260 may comprise one or more of conventional tabular data, row-based data, column-based data, and object-based data. Moreover, the data may be indexed and/or selectively replicated in an index to allow fast searching and retrieval thereof. Database 260 may support multi-tenancy to separately support multiple unrelated clients by providing multiple logical database systems which are programmatically isolated from one another.

Database 260 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 3:
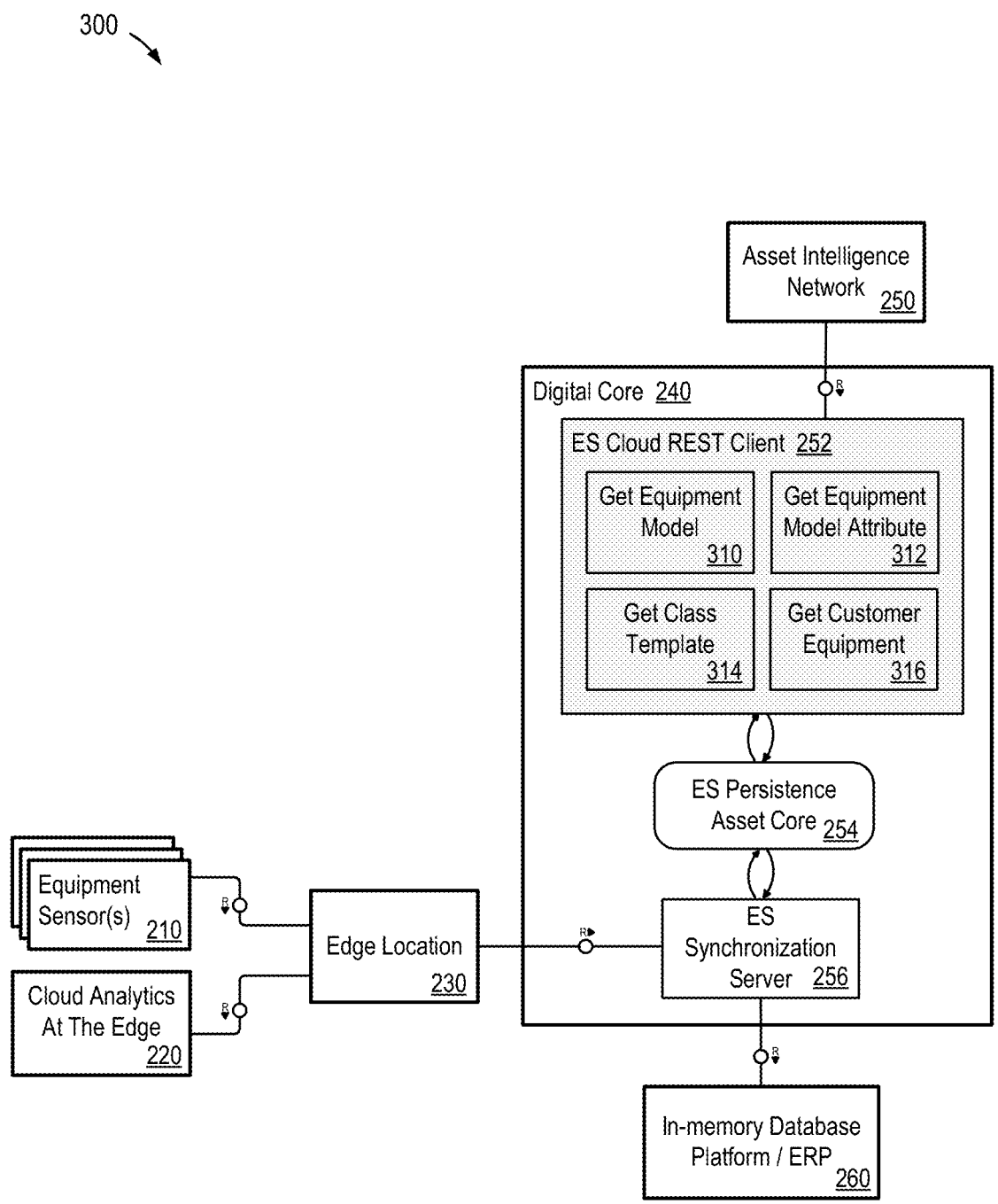
FIG. 3 is a more detailed block diagram of the system illustrated in FIG. 2 according to some embodiments, including exemplary additional details regarding extension of a cloud-based information exchange to the edge.

FIG. 3 illustrates a more detailed block diagram showing components of REST client 252 according to some embodiments. REST client 252 acquires information, such as get equipment model 310 (e.g., list of equipment), get equipment model attribute 312 (e.g., thresholds from the equipment), get class template 314 (e.g., sensor library), and get customer equipment attributes 316, from AIN 250. In some embodiments, this information is used to configure rules at edge location 230.

Figure 4:
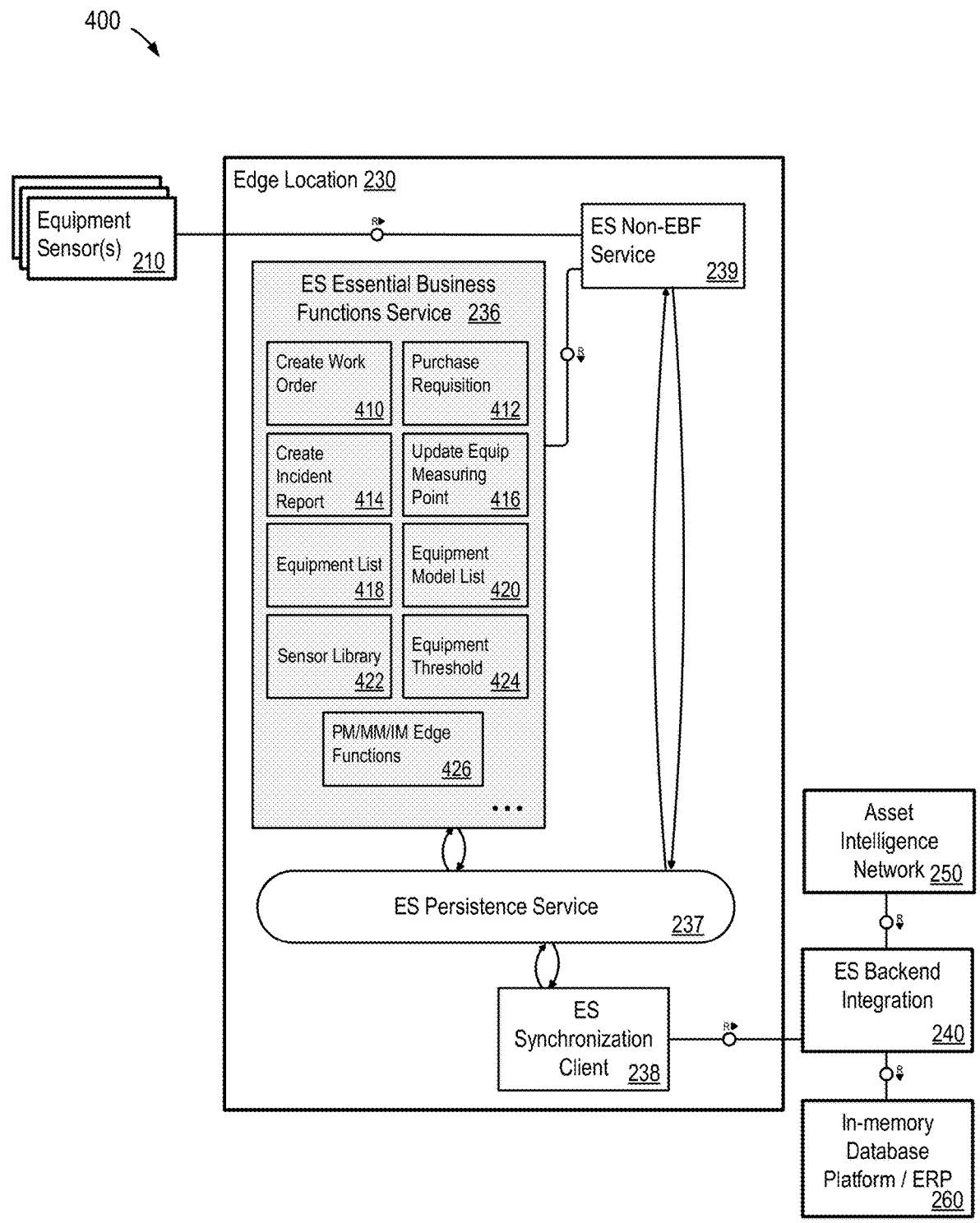
FIG. 4 is a more detailed block diagram of the system illustrated in FIG. 2 according to some embodiments, including exemplary additional details regarding essential business functions provided to the edge.

FIG. 4 illustrates a more detailed block diagram showing components of EBF service 236 according to some embodiments. EBF service 236 interfaces with backend systems such as ERP systems 260 and/or AIN 250. EBF service 236 provides edge functions (e.g., ERP functions) and APIs to other subsystems such as plant maintenance (PM), materials management (MM), inventory management (IM) edge functionality 426. Some of the PM/MM/IM core functions include, for example, creating a work order 410, creating a purchase requisition 412 (e.g., based on sensors such as smart-shelf sensors), creating an incident report 414 (e.g., log an employee safety incident), and updating or setting equipment measuring points 416. EBF service 236 may expose dynamic equipment data from an external cloud system such as Asset Central, including an equipment list 418, an equipment model list 420, a sensor library 422 (e.g., equipment class templates), and equipment attributes/thresholds 424 (e.g., operating ranges).

Figure 5:
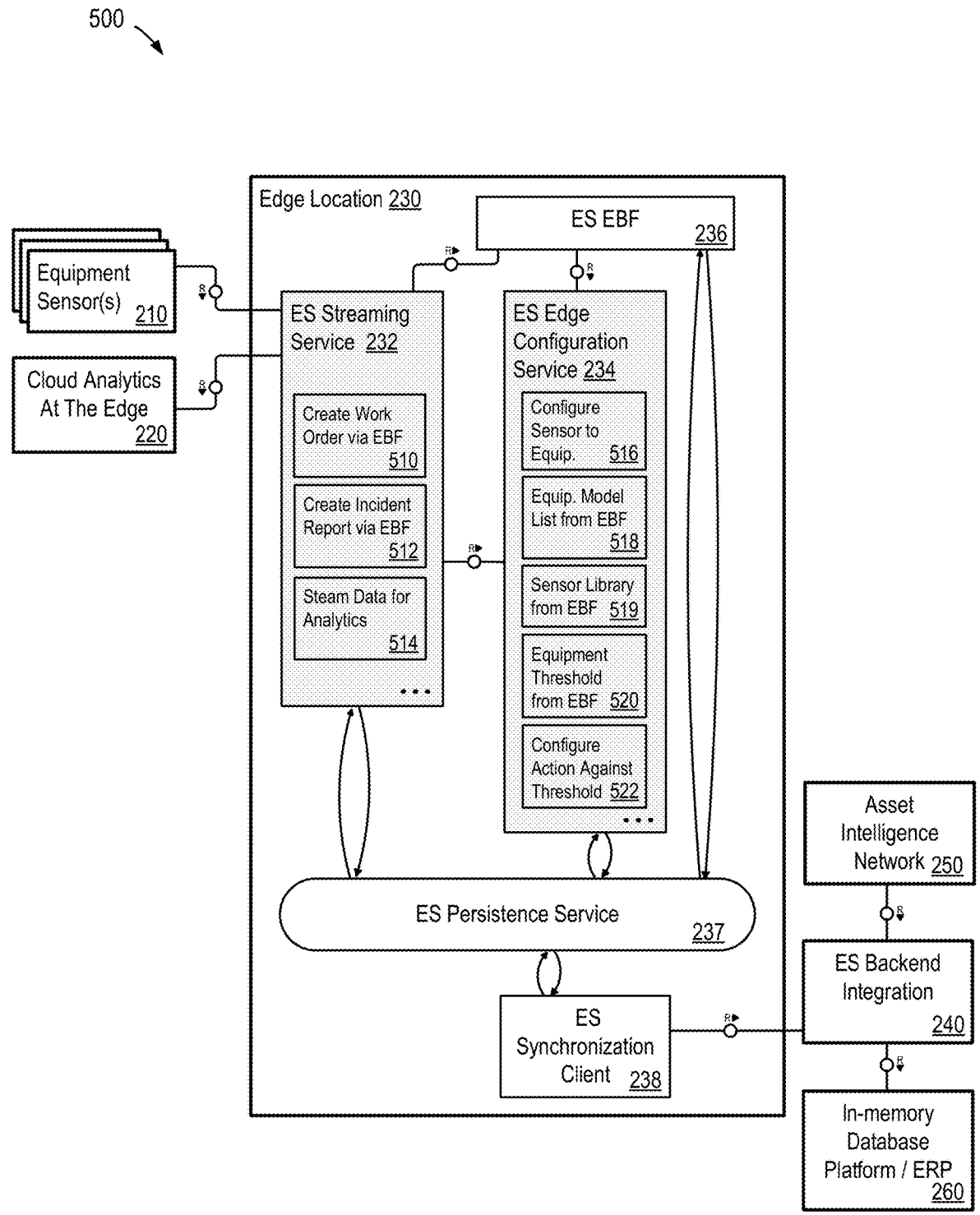
FIG. 5 is a more detailed block diagram of the system illustrated in FIG. 2 according to some embodiments, including exemplary additional details regarding configuration and streaming services at the edge.

FIG. 5 illustrates a more detailed block diagram showing edge configuration and streaming capabilities. Streaming service 232 and edge configuration service 234 consume EBF information from FIG. 4 (e.g., equipment model list from EBF 518, sensor library from EBF 519, equipment threshold from EBF 520) to, for example, configure thresholds 522, configure sensors to equipment 516, create and execute rules/actions (e.g., create work order 510, create incident report 512, stream data for analytics 514), etc. Rules are stored in persistence service 237.

Figure 6:
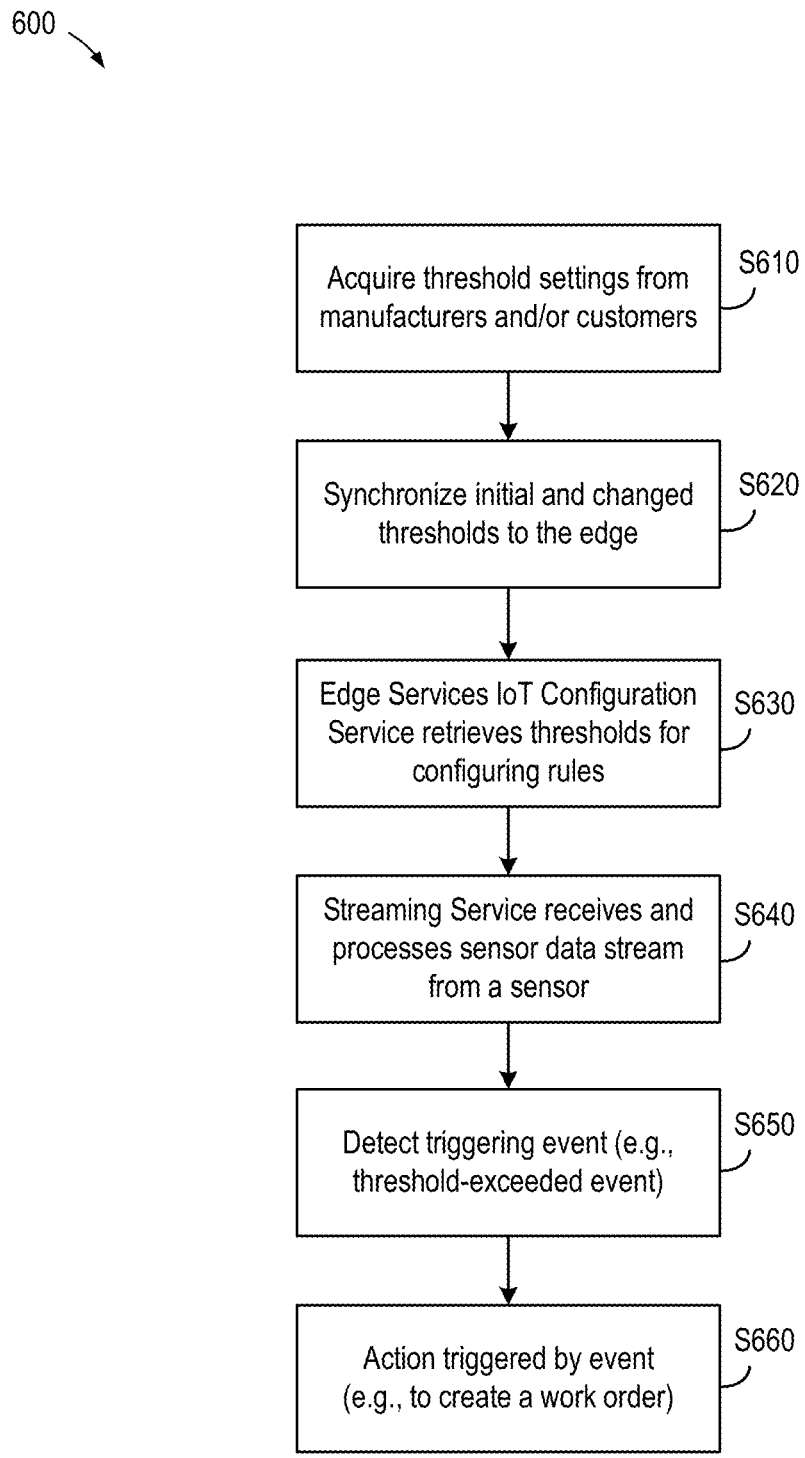
FIG. 6 is a flow diagram illustrating an exemplary process according to some embodiments.

FIG. 6 is a flow diagram illustrating an exemplary process 600 according to some embodiments. Initially, during a setup phase at design time, data is acquired at the edge starting at S610. For example, threshold settings/parameters (e.g., operating ranges, including upper/lower limits) are acquired from manufacturers and/or customers (e.g., based on information from Asset Intelligence Network 250). In one embodiment, initial threshold settings may be set by the manufacturer (e.g., default values), which may be overridden by users/consumers as desired.

Next, at S620, initial thresholds (e.g., set by the manufacturer) and changed thresholds (e.g., set by the customer) are synchronized to the edge 230. For example, the initial and changed thresholds are stored at edge location 230 using persistence service 237 via synchronization server 256 and synchronization client 238. At S630, edge services IoT configuration service 234 retrieves the thresholds for configuring rules. As described above, EBF service 236 at the edge location 230 interfaces with backend systems such as ERP systems 260 and/or AIN 250. Information from the backend systems made available at the edge allows users to dynamically generate rules at design time, and these rules may be modified at runtime (e.g., using edge configuration service 234 to leverage dynamic data/thresholds acquired from external systems such as AIN 250 via EBF service 236).

During an execution phase at the edge, starting at S640, a sensor data stream from a sensor is received and processed by streaming service 232. At S650, a determination is made as to whether a triggering event associated with a rule has been detected (e.g., threshold has been exceeded). When a triggering event (e.g., threshold-exceeded event) is detected, an action is triggered in response, at S660. In one embodiment, the action triggered by the event may be a request to create a work order or to report an incident. In other embodiments, the action triggered may include other actions relating to plant maintenance, materials management, inventory management, and/or other functions (e.g., business functions).

Advantageously, streaming rules may be dynamically configured at the edge and workflows may be automated based on IoT sensor streaming data.

FIGS. 7 and 8 are outward views of user interface (UI) screens according to some embodiments. More specifically, FIGS. 7 and 8 illustrate configuration tool capabilities relating to sensor profiles. A streaming service edge console is available where streaming service 232 is installed. Users define and manage sensor profiles and their associated rules and actions via the console.

Sensor profiles describe the readings generated by a sensor. They also control the interpretation of readings in the context of rule evaluation. Every rule that is configured is created in the context of a sensor profile.

Generally, an individual sensor has two sensor reading value types, numeric and state. A numeric sensor value type streams numeric sensor readings and a state sensor value type streams non-numeric sensor readings. For example, UI screen 700 allows configuration of sensor profiles which represent sensor data that is expressed numerically (e.g., temperature in degrees) and UI screen 800 allows configuration of sensor profiles which represent stateful data (e.g., whether a door is open or closed).

In the case of a numeric sensor value type stream, as shown in FIG. 7, parameters defined by the user include testing and production parameters, and window parameters. Testing and production parameters indicate a minimum value and a maximum value for sensor readings, which determine the range for sensor graphs and emulated controls. Window parameters are used by rules that aggregate sensor readings. For example, a value monitoring rule may use an average sensor reading based on the window parameters. A minimum number of readings for evaluation is the minimum number of sensor readings needed before averaging can be performed. This is useful for noisy analog sensors, for example, where trends are more important than individual readings. Window size is the length of time (e.g., in seconds) that sensor readings are kept for aggregation.

In the case of a state sensor value type stream, as shown in FIG. 8, parameters defined by the user include state values. State values indicate possible vales for sensor profile readings along with an equivalent state name. For example, a door could have state values 1 and 0, with respective names closed and open. Also for example, a traffic light could have state values 0, 1, and 2, with respective names red, green, and yellow.

FIGS. 9 through 13 are outward views of user interface (UI) screens according to some embodiments. More specifically, FIGS. 9 through 13 illustrate configuration tool capabilities relating to rules and rule types.

A rule is user-defined logic applied to the sensor readings of one or more specified sensor profiles. When a rule is satisfied, it triggers an event or controls the fidelity of IoT sensor data. Several built-in, configurable rule types are supported natively along with the option to build custom rules.

To create a rule, the logic used to determine that a certain event has occurred is first defined. A user may configure where these events are sent by specifying destinations within the rule. Destinations include the edge database and any number of available enterprise plugins. This allows the user to notify services that the event has occurred. In addition, a user can set one or more actions to be performed every time the event occurs.

A user may create rules within sensor profiles, which can be applied to a variety of scopes. They are also uniquely defined for the sensor profile they belong to. Rules can also be enabled or disabled by the administrator.

Generally, a rule contains the following sections: general information section (e.g., rule name, rule description, rule context data, and rule chainability), and a rule definition section (e.g., rule-specific attributes to define rule logic, such as a max event frequency, which controls how frequently an event occurs). Events trigger every time an associated sensor reading fulfills the requirements of the rule. Consider a temperature sensor that has risen to 90 degrees Celsius and remains that way. A value monitoring rule that triggers an event when the average sensor reading is over 80 degrees Celsius will fire constantly while the reading remains at 90 degrees. The max event frequency controls how frequently an event occurs. For an event to be triggered hourly, for example, a user would set the minimum time between events to 1 hour. Additionally, a rule may contain event actions (e.g., automated, user-configured responses to events generated by rules). Additionally or alternatively, a rule may specify other parameters or other combinations of parameters.

Rule types may include sensor fidelity rules, value monitoring rules, timed state rules, sensor watchdog rules, event chaining rules, and external custom rules. It is contemplated that other rules and customized rules may be set.

Referring to FIG. 9, in the illustrated embodiment, UI screen 900 allows configuration of value monitoring rules which monitor for thresholds of averaged values. A value monitoring rule type, which is applicable to numeric sensor data, uses a sensor profile's configurable time window settings to monitor a sensor's average reading value. Average values may be monitored for exceeding a threshold value or going below a threshold value (e.g., an average temperature sensor has gone over 70° C., with a minimum of five readings over a time window of 5 seconds).

Referring to FIG. 10, in the illustrated embodiment, UI screen 1000 allows configuration of timed state rules which monitor for devices being a particular state for a given amount of time. A timed state rule type, which is applicable to state sensor value types, is used to determine if a sensor has been in a specified state for a configured amount of time. For example, a door sensor has been in the "Open" state for one hour. Generally, timed state rules operate on an on-demand basis and computations are done (and events are triggered) when a new reading comes in.

Referring to FIG. 11, in the illustrated embodiment, UI screen 1100 allows configuration of watchdog rules which monitor for sensor streams which have gone silent for a given amount of time. A sensor watchdog rule type, which is applicable to both numeric and state sensor value types, is used to determine if a sensor has gone silent for a configurable time period. For example, when a temperature sensor has not streamed data for five minutes.

Referring to FIG. 12, in the illustrated embodiment, UI screen 1200 allows for the combining of individual rules. An event chaining rule type, which is applicable to both numeric and state sensor value types, is used to chain two events together. In one embodiment, two rules are chained at a time (e.g., Rule 1, "Temp Too High," and Rule 2, "Door Ajar," from FIGS. 9 and 10, respectively). This is possible when rules created by individual sensor profiles have the "Rule Chainability" field enabled. Event chaining rules themselves can also be chained.

Scoping allows rules to only apply to readings from a sensor with specific properties, controlling how often a rule is applied. A scope level is a set of predefined attributes that can apply to the device or the sensor. When a scope level is "Device Wide," the chained rule's events must occur on the same device ID. For purposes of illustration, in FIG. 12, Rule 1, "Temp Too High," and rule 2, "Door Ajar," have been chained and scoped to "Device Wide." Therefore, when conditions for both rules are met on the same device ID, the chained rule is triggered. Alternatively, when a scope level is "Device ID," the chained rule's events must occur on a specific device ID, which is the only device ID that can trigger the event.

The "Time Gap" field indicates the maximum time allowance between two chained events (e.g., a worker's motion sensor has reported the "Fallen" state within 60 seconds of a "High Gas Levels" event). The "Event Ordered" field specifies whether events must occur in the specified order of rule selection (e.g., Rule 1 before Rule 2). When not selected, the rule looks for the two events to occur within the time gap, regardless of order.

Referring to FIG. 13, in the illustrated embodiment, UI screen 1300 allows configuration of custom rules written in Cerner Command Language (CCL), a SQL-like language that specifies data flow, and hosted on a separate streaming engine. External custom rules allow developers to define their own rule logic and events.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

Figure 14:
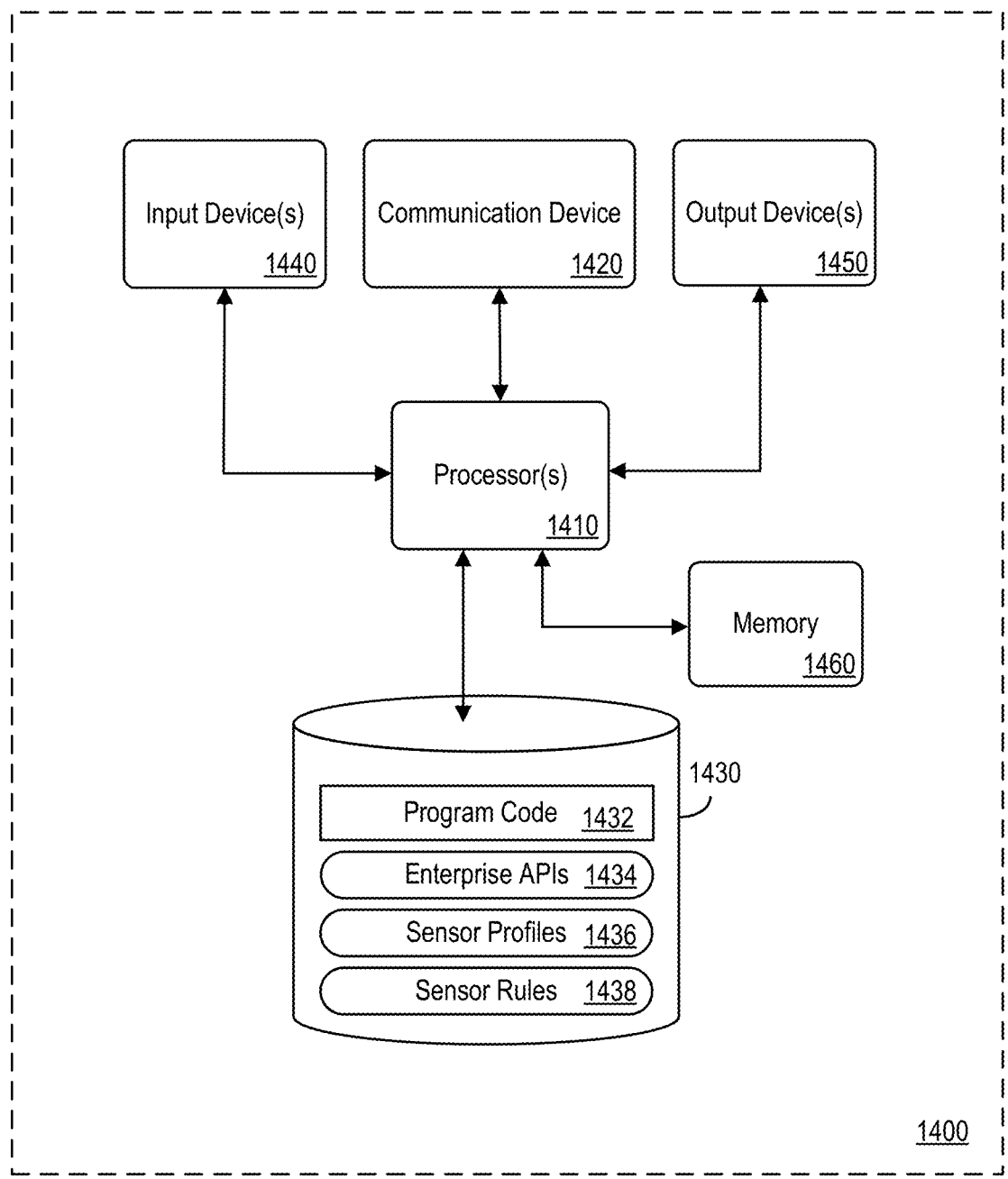
FIG. 14 is a block diagram of an apparatus according to some embodiments.

FIG. 14 is a block diagram of apparatus 1400 according to some embodiments. Apparatus 1400 may comprise a general- or special-purpose computing apparatus and may execute program code to perform any of the functions described herein. Apparatus 1400 may comprise an implementation of one or more elements of systems 100, 200, 300, 400 and 500. Apparatus 1400 may include other unshown elements according to some embodiments.

Apparatus 1400 includes processor(s) 1410 operatively coupled to communication device 1420, data storage device 1430, one or more input devices 1410, one or more output devices 1450, and memory 1460. Communication device 1420 may facilitate communication with external devices. Input device(s) 1440 may comprise, for example, a keyboard, a keypad, a mouse or other pointing device, a microphone, knob or a switch, an infra-red (IR) port, a docking station, and/or a touch screen. Input device(s) 1440 may be used, for example, to manipulate graphical user interfaces and to input information into apparatus 1400. Output device(s) 1450 may comprise, for example, a display (e.g., a display screen), a speaker, and/or a printer.

Data storage device 1430 may comprise any appropriate persistent storage device, including combinations of magnetic storage devices (e.g., magnetic tape, hard disk drives and flash memory), optical storage devices, Read Only Memory (ROM) devices, etc., while memory 1460 may comprise Random Access Memory (RAM).

Program code 1432 of data storage device 1430 may be executable by processor 1410 to provide functions described herein, including but not limited to process 600. Embodiments are not limited to execution of these functions by a single apparatus. Data storage device 1430 may store enterprise APIs 1434 including, for example, Essential Business Functions APIs (e.g., a work order API to render a work order, a threshold API to retrieve and update threshold information, etc.). Data storage device 1430 may also store sensor profiles 1436 and sensor rules 1438 (e.g., in the form of a table or any other data structure). Data storage device 1430 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units.

Embodiments are therefore not limited to any specific combination of hardware and software. Embodiments described herein are solely for the purpose of illustration. Those in the art will recognize other embodiments may be practiced with modifications and alterations to that described above.

What is claimed is:

1. A computer-implemented method comprising:
   at an edge location, the edge location being separate from a sensor and being disposed between the sensor and at least one backend system:
   receiving one or more threshold settings associated with the sensor of an Internet of Things (IoT) system;
   receiving a user input to configure rules specifying trigger conditions for one or more tasks;
   configuring, by a processor, two or more rules specifying one or more trigger conditions for a particular task of the two or more tasks, wherein the trigger conditions are based on the one or more threshold settings and on the user input, the user input comprising at least an instruction to chain at least two rules together for the particular task, wherein the configuring further comprising at the edge location: receiving threshold settings from the at least one backend system; and dynamically generating a particular rule at design time based on the received threshold settings from the at least one backend system;
   receiving a sensor data stream from the sensor;
   determining that the trigger conditions for the particular task have has been satisfied; and
   responsive to the determination that the trigger conditions have been satisfied, automatically executing the particular task specified by the chain of the at least two rules.

2. The method of claim 1, further comprising:
   acquiring initial threshold settings from manufacturer data, acquiring changed threshold settings from customer data, and synchronizing the acquired initial threshold settings and the acquired changed threshold settings to the edge location.

3. The method of claim 1, wherein determining that the trigger conditions have been satisfied further comprises determining that a threshold setting has been exceeded.

4. The method of claim 1, wherein the task includes at least one of creating a work order, creating a purchase requisition, and setting equipment measuring points.

5. The method of claim 1, wherein the one or more threshold settings are obtained from a central cloud-based information store.

6. The method of claim 1, wherein the two or more rules include at least one of a sensor watchdog rule, and a sensor fidelity rule.

7. The method of claim 1, wherein the two or more rules are configured via a user interface.

8. The method of claim 1, wherein the dynamically generated rule is based on the received threshold settings from the at least one backend system is modified at runtime.

9. The method of claim 1, further comprising translating data comprising equipment threshold settings/parameters from the sensor of the IoT system sensor into one or more edge transactions to provide one or more enterprise-related functionalities via the rule.

10. A system comprising:
    a processor; and
    a memory in communication with the processor, the memory storing program instructions, the processor operative with the program instructions to perform the operations, at an edge location, the edge location being separate from a sensor and being disposed between the sensor and at least one cloud-based backend system, of:
    receiving one or more threshold settings associated with the sensor of an Internet of Things (IoT) system;
    receiving a user input to configure rules specifying trigger conditions for one or more tasks;
    configuring two or more rules specifying a one or more trigger conditions for a particular task of the two or more tasks associated with a business process, wherein the trigger conditions are based on the one or more threshold settings and on the user input, the user input comprising at least an instruction to chain at least two rules together for the particular task, wherein the configuring further comprising at the edge location: receiving threshold settings from the at least one cloud-based backend system; and dynamically generating a particular rule at design time based on the received threshold settings from the at least one cloud-based backend system;
    receiving, from a streaming service, a sensor data stream from the sensor;
    determining that the trigger conditions for the particular task have been satisfied; and responsive to the determination that the trigger conditions have been satisfied, automatically executing the particular task specified by the chain of the at least two rules.

11. The system of claim 10, further comprising:
acquiring initial threshold settings from manufacturer data, acquiring changed threshold settings from customer data, and synchronizing the acquired initial threshold settings and the acquired changed threshold settings to the edge location.

12. The system of claim 10, wherein determining that the trigger conditions have been satisfied further comprises determining that a threshold setting has been exceeded.

13. The system of claim 10, wherein the task includes at least one of creating a work order, creating a purchase requisition, and setting equipment measuring points.

14. The system of claim 10, wherein the two or more rules include at least one of a sensor watchdog rule, and a sensor fidelity rule.

15. The system of claim 10, wherein the two or more rules are configured via a user interface.

16. The system of claim 10, further comprising synchronizing the one or more threshold settings.

17. A non-transitory computer-readable medium having stored therein instructions that when executed cause a computer to perform a method comprising:
at an edge location, the edge location being separate from a sensor and being disposed between the sensor and at least one backend system:
receiving one or more threshold settings associated with the sensor of an Internet of Things (IoT) system;
receiving a user input to configure rules specifying trigger conditions for one or more tasks;
configuring two or more rules specifying one or more trigger conditions for a task, wherein the trigger condition is based on the one or more threshold settings and on the user input, the user input comprising at least an instruction to chain at least two rules together for the particular task, wherein the configuring further comprising at the edge location:
receiving threshold settings from the at least one backend system; and dynamically generating a particular rule at design time based on the received threshold settings from the at least one backend system;
receiving a sensor data stream from the sensor;
determining that the trigger conditions have been satisfied; and
responsive to the determination that the trigger conditions for the particular task have been satisfied, automatically executing the task specified by the chain of the at least two rules.

18. The non-transitory computer-readable medium of claim 17, the instructions further comprising:
acquiring initial threshold settings from manufacturer data, acquiring changed threshold settings from customer data, and synchronizing the acquired initial threshold settings and the acquired changed threshold settings to the edge location.

19. The non-transitory computer-readable medium of claim 17, wherein determining that the trigger conditions have been satisfied further comprises determining that a threshold setting has been exceeded.

20. The non-transitory computer-readable medium of claim 17, wherein the task includes at least one of creating a work order, creating a purchase requisition, and setting equipment measuring points.

21. The non-transitory computer-readable medium of claim 17, wherein the one or more threshold settings are obtained from a central cloud-based information store.

22. The non-transitory computer-readable medium of claim 17, further comprising synchronizing the one or more threshold settings.

* * * * *